No. 636,559. Patented Nov. 7, 1899.
R. ROBINSON.
CAKE DOUGH MIXER.
(Application filed Aug. 12, 1897. Renewed Sept. 26, 1899.)
(No Model.)
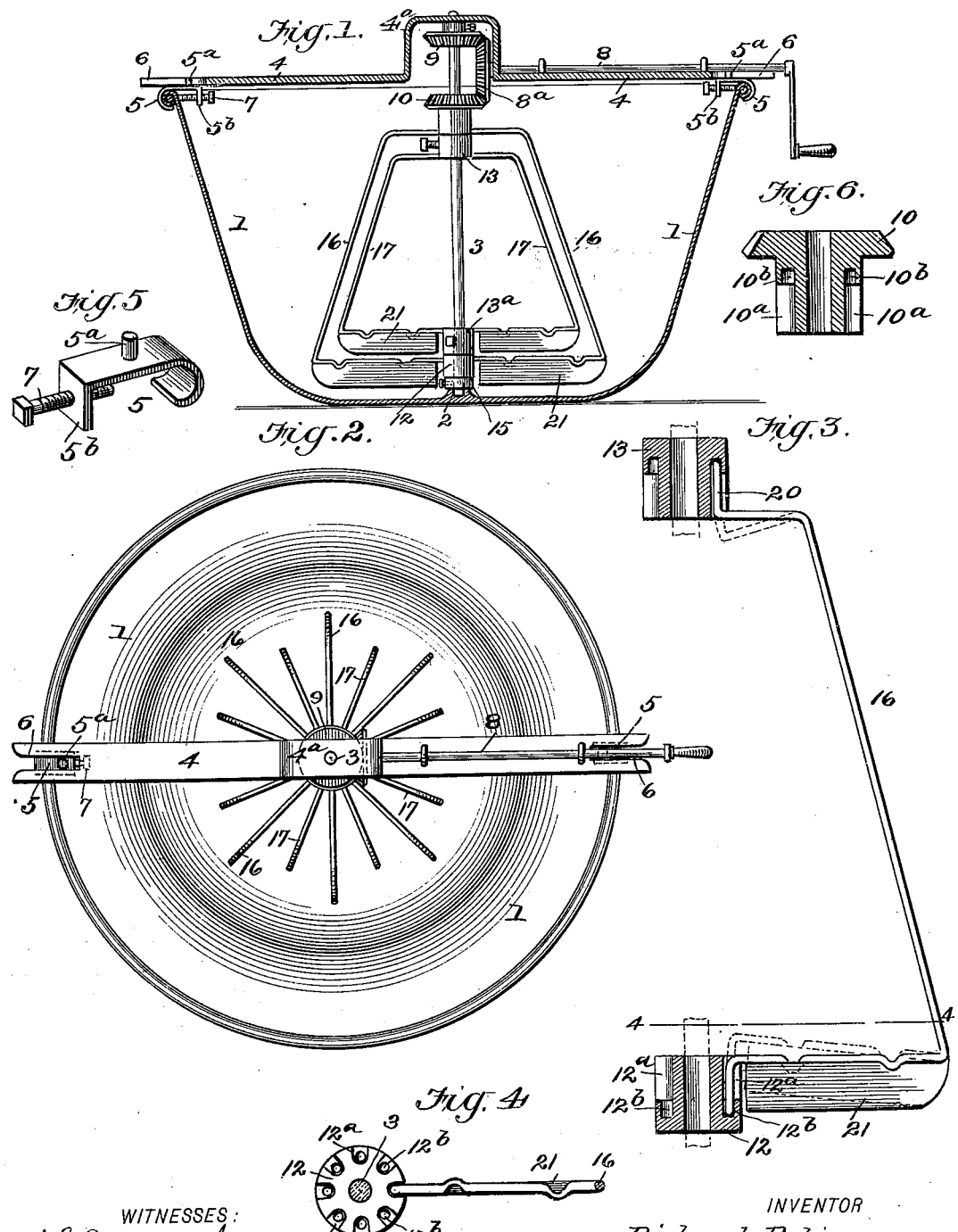
WITNESSES:
L. Dieterich
E. McCormic
INVENTOR
Richard Robinson.
BY
Fred G. Dieterich & Co.
ATTORNEYS
THE NORRIS PETERS CO., PHOTO-LITHO., WASHINGTON, D. C.

UNITED STATES PATENT OFFICE.

RICHARD ROBINSON, OF BILOXI, MISSISSIPPI.

CAKE-DOUGH MIXER.

SPECIFICATION forming part of Letters Patent No. 636,559, dated November 7, 1899.

Application filed August 12, 1897. Renewed September 26, 1899. Serial No. 731,769. (No model.)

*To all whom it may concern:*

Be it known that I, RICHARD ROBINSON, residing at Biloxi, in the county of Harrison and State of Mississippi, have invented certain new and useful Improvements in Cake-Dough Mixers, of which the following is a specification.

My invention relates to cake-dough mixers; and it seeks to provide a mixing device of this character of a very simple and economical construction which can be easily manipulated and which will effectively serve for its intended purposes.

The invention also seeks to provide certain mixing attachments which can be detachably applied to different sizes of dough-pans and having the whooping-paddles detachably connected with the operating-gearing, whereby the device can be easily packed away when the same is not in use.

The invention consists in a cake-dough mixer embodying the peculiar construction and novel arrangement of parts, such as will be first described in detail and then be specifically pointed out in the appended claims, reference being had to the accompanying drawings, in which—

Figure 1 is a vertical section of a mixing-pan with my improvements applied. Fig. 2 is a top plan view of the same. Fig. 3 is a detail view illustrating the manner in which the paddle or beater frames are secured to the drive-gear. Fig. 4 is a detail view of one of the whooping-paddles or whirl-frames. Fig. 5 is a view illustrating one of the adjusting devices whereby the bridge-piece can be fitted to different-sized pans, and Fig. 6 is a detail section of one of the drive-gears.

Referring to the accompanying drawings, in which like numerals indicate like parts in all the figures, 1 indicates the pan, which may be of the ordinary form and which has secured centrally on the bottom a socket-bearing 2 for the lower end of the operating-shaft 3, the upper end of which is supported in the arched portion $4^a$ of a bridge-bar 4, which in practice is made of a length sufficient to extend over a large-sized pan, and to provide for holding it secured to the large or smaller sized pans a pair of clamp-fingers 5, one for each end of the bridge-piece, is provided, which are held pendent from and are longitudinally adjustable on the said bridge-piece, they having shanks $5^a$, which extend up through longitudinal slots 6 in the bridge-piece, as clearly shown in Fig. 5, by reference to which and Fig. 1 it will be seen that the clamp 5 has a pendent member $5^b$, spaced apart from the clamp-finger, so as to extend down on the inside of the rim of the pan, such member having a threaded aperture to receive the clamp-screw 7.

In fitting my mixing devices to a pan the clamp-fingers are adjusted to engage the outer or rim edge of the pan and held in tight contact therewith by the clamp-screws, as shown.

The upper face of one end of the bridge-piece has bearings for a crank-shaft 8, the inner end of which has a bevel-cog $8^a$, which meshes with a bevel-gear 9, fixedly secured to shaft 3, and with a bevel-gear 10, loosely held on such shaft, it being obvious that such construction provides for a reverse rotation of the gears 9 and 10. The gear 10 has a pendent hub provided with a series of radial slots $10^a$ at the lower end, which terminate at the top in sockets $10^b$.

12 indicates a collar held loosely and vertically adjustable on the shaft 3, which has radial slots $12^a$ in the upper end, which terminate at the bottom in sockets $12^b$.

13 $13^a$ indicate collars vertically movable on the shaft 3, but held to turn therewith by the clamp-screws. These collars are also provided with radial slots and sockets similar to those in the collars 12 and hub of gear 10.

15 indicates a clamp-collar held on the shaft below the loose collar 12, it, together with the collar $13^a$, holding the collar 12 to its vertically-set position.

16 indicates the outer and 17 the inner set of whirling frames, the outer ones being secured to the hub of gear 10 and loose collar 12 and the inner set to the fast collars 13 $13^a$. Each frame 16 or 17 consists of a stout spring-wire bent to form a cone-section, the upper and lower ends being, however, bent in horizontally and terminating in vertical portions 20, which are adapted to fit the radial slots in the collars to which they are attached, it being understood that by compressing the horizontal ends of the frames the portions 20 can be sprung up into the sockets in the collars, as clearly shown in the drawings.

By providing collars and frames constructed in the manner described a simple, convenient, and effective means for securing the frames to the drive-gearing is provided. Furthermore, by providing collars having a vertical adjustment on the shaft they can be set to provide a tight attachment for the frame in case the tension of such frame becomes weakened by use.

Each of the whirl-frames carries at the bottom a paddle 21, of wood, which run near each other and as they rotate in reverse directions produce a slapping action on the dough and in consequence give it a successive turning action or "whoop," and thereby fix it in a very short time.

In use the operator turns the handle, which through the medium of the reversely-rotating gearing rotates the whirl-frames and paddles quickly, but in reverse directions.

The several parts are so constructed and arranged that they can be readily assembled and detached, the whole forming a very useful kitchen appliance.

Having thus described my invention, what I claim, and desire to secure by Letters Patent, is—

1. In a mixing-machine, the combination with the pan, the bridge-piece and the vertical shaft journaled in the pan and bridge-piece, said shaft having a loose and fixed gear, and a loose and fixed collar, and the crank-shaft and gear for operating the said fixed and loose gears, of whirling frames each consisting of a spring-body having horizontal members at the top and bottom, having lock ends to engage the fast and loose collars and the fixed gear, and held locked by the spring expansion of such ends as specified.

2. In a mixing device as described, the combination with the operating-shaft, and drive means, of collars held on the shaft having radial slots and sockets, and whirling frames formed of a spring-wire, bent substantially in a semiconical shape, having horizontal upper and lower members provided with angle fingers or extensions adapted to seat in the radial slots and have their ends engage the sockets in such collars, substantially as shown and for the purposes described.

RICHARD ROBINSON.

Witnesses:
LEVY MORRIS,
A. DAVIS.